US007989564B2

(12) United States Patent
Loveday et al.

(10) Patent No.: US 7,989,564 B2
(45) Date of Patent: Aug. 2, 2011

(54) CATALYST SYSTEMS AND THEIR USE IN POLYMERIZATION PROCESSES

(75) Inventors: Donald Ray Loveday, Clarence Center, NY (US); Moses O. Jejelowo, Webster, NY (US); Sun-Chueh Kao, Hillsborough, NJ (US)

(73) Assignee: Univation Technologies, LLC, Houston, TX (US)

( * ) Notice: Subject to any disclaimer, the term of this patent is extended or adjusted under 35 U.S.C. 154(b) by 456 days.

(21) Appl. No.: 12/148,269

(22) Filed: Apr. 17, 2008

(65) Prior Publication Data

US 2008/0214753 A1 Sep. 4, 2008

Related U.S. Application Data

(60) Division of application No. 10/883,551, filed on Jul. 1, 2004, now Pat. No. 7,381,783, which is a continuation of application No. 10/696,680, filed on Oct. 29, 2003, now abandoned, which is a division of application No. 09/808,609, filed on Mar. 14, 2001, which is a division of application No. 09/207,213, filed on Dec. 8, 1998, now Pat. No. 6,248,845, which is a continuation-in-part of application No. 08/986,696, filed on Dec. 8, 1997, now Pat. No. 6,242,545.

(51) Int. Cl.
*C08F 4/42* (2006.01)
*B01J 31/38* (2006.01)

(52) U.S. Cl. ........ 526/160; 526/352; 502/113; 502/117; 502/152

(58) Field of Classification Search .................. 526/352, 526/160; 502/113, 117, 152
See application file for complete search history.

(56) References Cited

U.S. PATENT DOCUMENTS

| | | |
|---|---|---|
| 4,405,495 A | 9/1983 | Lee et al. |
| 4,704,491 A | 11/1987 | Tsutsui et al. .................. 585/10 |
| 4,914,253 A | 4/1990 | Chang ............................ 585/523 |
| 4,927,797 A | 5/1990 | Ewen ............................. 502/127 |
| 4,931,417 A | 6/1990 | Miya et al. .................... 502/117 |
| 5,001,205 A | 3/1991 | Hoel .............................. 526/128 |
| 5,017,714 A | 5/1991 | Welborn, Jr. .................... 556/12 |
| 5,017,800 A | 5/1991 | Divan ............................ 307/66 |
| 5,026,797 A | 6/1991 | Takahashi ...................... 526/124 |
| 5,055,438 A | 10/1991 | Canich .......................... 502/117 |
| 5,084,534 A | 1/1992 | Welborn, Jr. et al. ......... 526/160 |
| 5,086,134 A | 2/1992 | Antberg et al. ............... 526/126 |
| 5,096,867 A | 3/1992 | Canich .......................... 502/103 |
| 5,198,401 A | 3/1993 | Turner et al. .................. 502/155 |
| 5,218,071 A | 6/1993 | Tsutsui et al. ................. 526/348 |
| 5,229,478 A | 7/1993 | Floyd et al. ................... 526/160 |
| 5,258,475 A | 11/1993 | Kissin .......................... 526/129 |
| 5,264,405 A | 11/1993 | Canich .......................... 502/103 |
| 5,278,119 A | 1/1994 | Turner et al. .................. 502/155 |
| 5,281,679 A * | 1/1994 | Jejelowo et al. .............. 526/114 |
| 5,290,745 A | 3/1994 | Jorgensen et al. |
| 5,324,800 A | 6/1994 | Welborn, Jr. et al. ......... 526/160 |
| 5,332,706 A | 7/1994 | Nowlin et al. ................. 502/107 |
| 5,376,439 A | 12/1994 | Hodgson et al. |
| 5,384,299 A | 1/1995 | Turner et al. .................. 502/155 |
| 5,387,660 A | 2/1995 | Doyle et al. ..................... 526/69 |
| 5,408,017 A | 4/1995 | Turner et al. .................. 526/134 |
| 5,416,228 A | 5/1995 | Ewen et al. |
| 5,491,207 A | 2/1996 | Hoel .............................. 526/129 |
| 5,523,435 A | 6/1996 | Lisowsky ........................ 556/11 |
| 5,525,689 A | 6/1996 | Tsutsui et al. ................. 526/160 |
| 5,541,272 A | 7/1996 | Schmid et al. ................. 526/160 |
| 5,550,094 A | 8/1996 | Ali et al. |
| 5,602,067 A | 2/1997 | Nowlin et al. |
| 5,608,019 A | 3/1997 | Cheruvu et al. |
| 5,621,054 A | 4/1997 | Harrington |
| 5,621,126 A | 4/1997 | Canich et al. ..................... 556/9 |
| 5,648,310 A | 7/1997 | Wasserman et al. |
| 5,674,795 A | 10/1997 | Wasserman et al. |
| 5,688,735 A | 11/1997 | Ewen et al. |
| 5,714,426 A | 2/1998 | Tsutsui et al. |
| 5,763,543 A | 6/1998 | Muhle et al. |
| 5,767,208 A | 6/1998 | Turner et al. .................. 526/160 |
| 5,789,332 A | 8/1998 | Kutschera et al. |
| 6,124,229 A | 9/2000 | Becker et al. |
| 6,147,172 A | 11/2000 | Brown et al. |
| 6,234,950 B1 | 5/2001 | von Haken Spence et al. |
| 6,235,671 B1 | 5/2001 | McKay et al. |
| 6,235,672 B1 | 5/2001 | McKay et al. |
| 6,239,061 B1 | 5/2001 | Wang et al. |
| 6,239,238 B1 | 5/2001 | Brown et al. |
| 6,242,545 B1 | 6/2001 | Jejelowo et al. |
| 6,248,845 B1 | 6/2001 | Loveday et al. |
| 6,281,306 B1 | 8/2001 | Oskam et al. |
| 6,355,744 B1 | 3/2002 | von Haken Spence et al. |
| 6,433,203 B1 | 8/2002 | Dall'occo et al. |
| 6,486,273 B1 | 11/2002 | McKay et al. |

(Continued)

FOREIGN PATENT DOCUMENTS

EP 0 316 155 5/1989

(Continued)

OTHER PUBLICATIONS

Abstract—JP 01-319489 (equivalent to US 4,931,417).
Heiland et al., "Comparison of Zirconocene and Hafnocene Catalysts for the Polymerization of Ethylene and 1-Butene" Makromol. Chem., v. 193, pp. 601-610 (1992).
Abstract—JP 07-252267 (Oct. 3, 1995).
Abstract—JP 07-252287 (Oct. 3, 1995).
Abstract—JP 07-330820 (Dec. 19, 1995).
Hawley's Condensed Chemical Dictionary, 13th Edition, John Wiley & Sons, Inc., p. 34, (1997), New York.
Mäkelä-Vaarne et al., "Supported Metallocene Catalysts-Interactions of $(n\text{-}BuCp)_2HfCl_2$ With Methylaluminoxane and Silica," Journal of Molecular Catalysis A: Chemical 200, (2003), pp. 323-332.

(Continued)

Primary Examiner — Ling-Siu Choi

(57) ABSTRACT

A catalyst system comprising a hafnocene catalyst compound and zirconocene catalyst compound, wherein the hafnocene and/or zirconocene include(s) at least one ligand substituted with at least one linear or iso alkyl group having 3 or more carbon atoms is provided. A process for polymerizing olefin(s) using the same catalyst system is also provided.

18 Claims, No Drawings

U.S. PATENT DOCUMENTS

| | | |
|---|---|---|
| 6,528,597 B2 | 3/2003 | Loveday et al. ............ 526/113 |
| 6,579,998 B2 | 6/2003 | Sita et al. |
| 6,649,558 B2 | 11/2003 | Brown et al. |
| 6,656,866 B2 | 12/2003 | Wenzel et al. |
| 6,656,868 B2 | 12/2003 | Oskam et al. |
| 6,660,815 B2 | 12/2003 | Agapiou et al. |
| 6,800,704 B2 | 10/2004 | Floyd et al. |
| 7,381,783 B2 | 6/2008 | Loveday et al. |
| RE40,751 E | 6/2009 | Jejelowo et al. |
| 2001/0020074 A1 | 9/2001 | Jejelowo et al. |
| 2004/0097365 A1 | 5/2004 | Loveday et al. |
| 2006/0293470 A1 | 12/2006 | Cao et al. |
| 2007/0276106 A1 | 11/2007 | Cao et al. |
| 2008/0108768 A1 | 5/2008 | Loveday et al. |

FOREIGN PATENT DOCUMENTS

| | | |
|---|---|---|
| EP | 0 413 326 | 2/1991 |
| EP | 0420436 A1 | 4/1991 |
| EP | 0 443 686 | 8/1991 |
| EP | 0 443 768 | 8/1991 |
| EP | 0 481 480 | 4/1992 |
| EP | 0 495 099 | 7/1992 |
| EP | 0 515 132 | 11/1992 |
| EP | 0 596 553 | 5/1994 |
| EP | 0 612 768 | 8/1994 |
| EP | 0 284 707 | 8/1995 |
| EP | 0 669 346 | 8/1995 |
| EP | 0284707 B1 | 8/1995 |
| EP | 0 735 059 | 10/1996 |
| EP | 0 773 239 | 5/1997 |
| EP | 0 781 789 | 7/1997 |
| EP | 0668295 B1 | 6/1998 |
| JP | 09-504563 | 5/1997 |
| JP | 2001-525457 | 12/2001 |
| WO | 91/03505 | 3/1991 |
| WO | 94/03509 | 2/1994 |
| WO | 94/17112 | 8/1994 |
| WO | 95/04761 | 2/1995 |
| WO | 95/11263 | 4/1995 |
| WO | 97/03080 | 1/1997 |
| WO | 97/22635 | 6/1997 |
| WO | 98/02470 | 1/1998 |
| WO | WO 02/46250 | 6/2002 |

OTHER PUBLICATIONS

Tian et al., "*Ethylene Polymerization With Catalyst Systems Based on Metallocenes With Varying Steric Hindrance and Methylaluminoxane,*" Macromol. Rapid Commun., 15, Huthig & Wepf Verlag, Zug (1994), pp. 923-928, People's Republic of China.

Usami, Takao et al., "*Generation Mechanism of Short-Chain Branching Distribution in Linear Low-Density Polyethylenes*" Macromolecules, vol. 19, p. 2722-2726 (1986).

Abstract—JP 07-252267.

Abstract—JP 07-252287.

Abstract—JP 07-330820.

Abstract—JP 09-176400.

Hawley's Condensed Chemical Dictionary, 13th Edition, John Wiley & Sons, p. 34, 1997.

\* cited by examiner

CATALYST SYSTEMS AND THEIR USE IN POLYMERIZATION PROCESSES

CROSS-REFERENCE TO RELATED APPLICATION

The present application is a Divisional Application of U.S. Ser. No. 10/883,551, filed Jul. 1, 2004, now allowed, which is a Continuation Application of U.S. Ser. No. 10/696,680, filed on Oct. 29, 2003, now abandoned, which is a Divisional Application of U.S. Ser. No. 09/808,609 filed Mar. 14, 2001, now abandoned, which is a Divisional Application of U.S. Ser. No. 09/207,213, now issued as U.S. Pat. No. 6,248,845, which is a Continuation-in-Part application of U.S. Ser. No. 08/986,696 filed Dec. 8, 1997, now issued as U.S. Pat. No. 6,242,545; the disclosures of which are incorporated by reference in their entireties.

The application is also related to U.S. Ser. No. 11/977,761, filed Oct. 26, 2007, and U.S. Ser. No. 09/805,819, filed Mar. 14, 2001, now issued as U.S. Pat. No. 6,528,597.

BACKGROUND

This invention relates to catalysts, catalyst systems and their use in olefin polymerization. The invention more particularly relates to substituted hafnium metallocene-type catalyst compounds, catalyst systems thereof, their use in a polymerizing process, their polymer products, and articles thereof.

The use of bulky ligand transition metal catalyst compounds in polymerization processes to produce a diverse array of new polymers for use in a wide variety of applications and products is well known in the art. Typical bulky ligand transition metal compounds, known as metallocene-type compounds, are generally described as containing one or more ligands capable of η-5 bonding to the transition metal atom, usually, cyclopentadienyl derived ligands or moieties, in combination with a transition metal selected from Group 4, 5 or 6 or from the lanthanide and actinide series of the Periodic Table of Elements. Predominantly in the literature the transition metal is from Group 4, particularly either titanium, zirconium or hafnium, and the cyclopentadienyl derived ligand or moiety is substituted with various radicals, typically alkyl radicals, or two or more cyclopentadienyl ligands are joined by a structural bridge, usually an organic or inorganic group, typically, a carbon or silicon atom containing group.

Other forms of these metallocene-type catalyst compounds contain a cyclopentadienyl derived ligand or moiety and a heteroatom containing group bonded to a transition metal, typically titanium, where the cyclopentadienyl ligand or moiety and the heteroatom containing group are joined by a structural bridge, usually a silicon atom containing group. These and other metallocene-type catalyst compounds in combination with an activator form metallocene-type catalyst systems capable of polymerizing various olefin(s), alone or in combination with other olefin(s). The development of these and other metallocene-type catalyst compounds and catalyst systems are described in U.S. Pat. Nos. 5,017,714, 5,055,438, 5,096,867, 5,198,401, 5,229,478, 5,264,405, 5,278,119, 5,324,800, 5,384,299, 5,408,017, 5,491,207 and 5,621,126 all of which are herein fully incorporated by reference.

It is well known in the art, although not fully understood, that where the transition metal of these metallocene-type catalyst compounds is hafnium, often referred to as a "hafnocene", hafnocene catalyst systems generally, among other characteristics, perform relatively poorly in comparison to their titanium, especially their zirconium equivalents, often referred to as "zirconocenes". Although hafnocenes will typically polymerize polymers having higher molecular weights than their zirconocene equivalents under similar polymerization conditions, their overall poor activity make them inferior polymerization catalysts. European patent EP 0 284 707 B1 granted Aug. 30, 1995, which is fully incorporated herein by reference, describes a process for polymerizing olefins using a catalyst system, in liquid form, containing a chiral, sterorigid bridged hafnium metallocene catalyst compound and an aluminum compound.

Thus, it would be highly advantageous to have a hafnium metallocene-type catalyst system capable of polymerizing olefin(s) with improved catalyst performance.

SUMMARY

In an embodiment, this invention relates to an ethylene copolymer having a polymodal CD, wherein under temperature rising elution fractionation (TREF) analysis the ethylene copolymer evidences at least two peaks.

In another embodiment, this invention relates to an ethylene copolymer having a polymodal CD, wherein under temperature rising elution fractionation (TREF) analysis the ethylene copolymer evidences at least two peaks, and wherein the ethylene copolymer is produced in a single reactor.

In still another embodiment, this invention relates to an ethylene copolymer having a polymodal CD, wherein the ethylene copolymer is produced in a single reactor; wherein under temperature rising elution fractionation (TREF) analysis the ethylene copolymer evidences at least two peaks; wherein the ethylene copolymer has an Mw/Mn of from about 2.5 to about 7; wherein the ethylene copolymer has a density of from 0.905 to 0.95 g/cc; wherein the ethylene copolymer exhibits a low-temperature peak position at about 65° C. under temperature rising elution fractionation (TREF) analysis; wherein the ethylene copolymer exhibits a peak separation between the low-temperature and high-temperature peaks of a minimum of about 20° C. and a maximum of about 35° C. under temperature rising elution fractionation (TREF) analysis; wherein the ethylene copolymer exhibits low-temperature peak ranges from about 30 mole % and the high-temperature peak is about 70 mole % under temperature rising elution fractionation (TREF) analysis; and wherein the ethylene copolymer comprises about 0.01 ppm to about 2 ppm hafnium.

DETAILED DESCRIPTION OF INVENTION

The invention is directed toward a hafnium transition metal metallocene-type catalyst system for polymerizing one or more olefin(s). It has been surprisingly discovered that by properly substituting the cyclopentadienyl derived ligand or moiety of a hafnocene results in an improved catalyst system. Unexpectedly where the substituent on the bulky ligand or moiety is a substituent having 3 or more non-hydrogen atoms, preferably 3 or more carbon atoms, preferably an alkyl substituent, for example n-propyl or n-butyl, the catalyst activity of the hafnocene metallocene-type catalyst system is substantially improved. Along with a sufficiently commercially acceptable activity, the hafnocene catalyst systems of the invention produces polymers having higher molecular weights in comparison to its zirconocene equivalents at the same or similar polymerization conditions. It was surprising that the substituted hafnocene of the invention will tend to produce lower density polymer products than its zirconocene equivalent at substantially the same molecular weight.

Catalyst Components and Catalyst Systems

Preferred metallocene catalysts of the invention, for example, are typically those bulky ligand transition metal complexes described by formula (I):

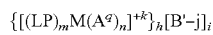

$$\{[(LP)_m M(A^q)_n]^{+k}\}_h [B'-j]_i$$

where L is a substituted bulky ligand bonded to M, p is the anionic charge of L and m is the number of L ligands and m is 1, 2 or 3; at least one L is substituted with at least one substituent having 3 or more non-hydrogen atoms, preferably having 3 or more carbon atoms or silicon atoms or combination thereof; A is a ligand bonded to M and capable of inserting an olefin between the M-A bond, q is the anionic charge of A and n is the number of A ligands and n is 1, 2, 3 or 4, M is a transition metal of which 95 mole % or greater is hafnium (Hf), preferably greater than 97 mole % Hf, more preferably greater than 98 mole % Hf, and most preferably in the range of greater than 99 mole % Hf to less than 100 mole % Hf, and (p×m)+(q×n)+k corresponds to the formal oxidation state of the metal center; where k is the charge on the cation and k is 1, 2, 3 or 4, and B' is a chemically stable, non-nucleophilic anionic complex, preferably having a molecular diameter of 4 Å or greater and j is the anionic charge on B', h is the number of cations of charge k, and i the number of anions of charge j such that h×k=j×i.

Any two L and/or A ligands may be bridged to each other and/or unbridged. The catalyst compound may be full-sandwich compounds having two or more ligands L, which include cyclopentadienyl derived ligands or substituted cyclopentadienyl derived ligands, or half-sandwich compounds having one ligand L, which is a cyclopentadienyl derived ligand or heteroatom substituted cyclopentadienyl derived ligand or hydrocarbyl substituted cyclopentadienyl derived ligand or moiety such as an indenyl ligand, a benzindenyl ligand or a fluorenyl ligand and the like including hydrogenated versions thereof or any other ligand capable of η-5 bonding to the transition metal atom. One or more of these bulky ligands is π-bonded to the transition metal atom. At least one L is substituted with at least one substituent having 3 or more non-hydrogen atoms, preferably having 3 or more carbon atoms or 3 or more non-hydrogen atoms of which at least one is a silicon atom; in addition, L can be substituted with a combination of additional substituents, which can be the same or different. Non-limiting examples of non-hydrogen atoms include silicon, germanium, tin, oxygen, nitrogen or carbon and combinations thereof. Non-limiting examples of additional substituents include hydrogen or a linear, branched or cyclic alkyl, alkenyl or aryl radical or combination thereof having from 1 to 30 carbon atoms. The at least one substituent or the additional substituents can also be substituted with hydrogen or a linear, branched or cyclic alkyl, alkenyl or aryl radical having from 1 to 30 carbon atoms or non-hydrogen atoms. L may also be other types of bulky ligands including but not limited to bulky amides, phosphides, alkoxides, aryloxides, imides, carbolides, borollides, porphyrins, phthalocyanines, corrins and other polyazomacrocycles. Other ligands may be bonded to the hafnium transition metal, such as a leaving group, such as—but not limited to weak bases—such as amines, phosphines, ether and the like. In addition to the transition metal, these ligands may be optionally bonded to A or L. Non-limiting examples of catalyst components and catalyst systems are discussed, in for example, U.S. Pat. Nos. 4,530,914, 4,871,705, 4,937,299, 5,124,418, 5,017,714, 5,120,867, 5,210,352, 5,278,264, 5,278,119, 5,304,614, 5,324,800, 5,347,025, 5,350,723, 5,391,790, 5,391,789, 5,399,636, 5,539,124, 5,455,366, 5,534,473, 5,684,098 and 5,693,730; all of which are herein fully incorporated by reference. Also, the disclosures of European publications EP-A-0 591 756, EP-A-0 520 732, EP-A-0 420 436, EP-B1 0 485 822, EP-B1 0 485 823 and EP-A2-0 743 324 and PCT publications WO 91/04257, WO 92/00333, WO 93/08221, WO 93/08199, WO 94/01471, WO 96/20233, WO 97/15582 and WO 97/19959 are all herein fully incorporated by reference.

In one embodiment, the activated catalyst of the invention is formed from a hafnocene catalyst compound represented by the general formula (II):

$$(LP)_m M(A^q)_n (E^r)_o$$

where L is a bulky ligand substituted with at least one substituent having 3 or more non-hydrogen atoms, preferably 3 or more carbon atoms, preferably an alkyl substituent having 3 or more carbon atoms, even more preferably a linear alkyl substituent having 3 or more carbon atoms, M is Hf, A, and p, m, q and n are as defined above and E is an anionic leaving group such as but not limited to hydrocarbyl, hydride, halide or combination thereof or any other anionic ligands; r is the anionic charge of E and o is the number of E ligands and o is 1, 2, 3 or 4 such that (p×m)+(q×n)+(r×o) is equal to the formal oxidation state of the metal center; and an aluminum alkyl, alumoxane, modified alumoxane or any other oxy-containing organometallic compound or non-coordinating ionic activators, or a combination thereof.

In one embodiment of the invention the substituted hafnocene catalyst compound of the invention includes monocyclopentadienyl-heteroatom ligand containing hafnium transition metal metallocene-type compounds. This metallocene-type compound is activated by either an alumoxane, modified alumoxane, a non-coordinating ionic activator, a Lewis acid or a combination thereof to form an active polymerization catalyst system. These types of catalyst systems are described in, for example, PCT publication WO 92/00333, WO 94/07928, WO 91/04257, WO 94/03506, WO96/00244 and WO 97/15602 and U.S. Pat. Nos. 5,057,475, 5,096,867, 5,055,438, 5,198,401, 5,227,440 and 5,264,405 and European publication EP-A-0 420 436, all of which are herein fully incorporated by reference. Additionally it is within the scope of this invention that the metallocene catalysts and catalyst systems may be those described in U.S. Pat. Nos. 5,064,802, 5,145,819, 5,149,819, 5,243,001, 5,239,022, 5,276,208, 5,296,434, 5,321,106, 5,329,031, 5,304,614 and 5,677,401, and PCT publications WO 93/08221, WO 93/08199 and WO 95/07140 and European publications EP-A-0 578 838 and EP-A-0 638 595 all of which are herein fully incorporated by reference.

In another embodiment, the catalyst component is represented by the formula (III):

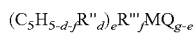

$$(C_5H_{5-d-f}R''_d)_e R'''_f M Q_{g-e}$$

wherein M is a Hf transition metal, $(C_5H_{5-d-f}R''_d)$ is an unsubstituted or substituted cyclopentadienyl ligand bonded to M, wherein at least one $(C_5H_{5-d-f}R''_d)$ has at least one R" that is an alkyl substituent having 3 or more carbon atoms, each additional R", which can be the same or different is hydrogen or a substituted or unsubstituted hydrocarbyl having from 1 to 30 carbon atoms or combinations thereof or two or more carbon atoms are joined together to form a part of a substituted or unsubstituted ring or ring system having 4 to 30 carbon atoms, R'" is one or more or a combination of carbon, germanium, silicon, phosphorous or nitrogen atoms containing radical bridging two $(C_5H_{5-d-f}R''_d)$ rings, or bridging one $(C_5H_{5-d-f}R''_d)$ ring to M; each Q which can be the same or different is a hydride, substituted or unsubstituted hydrocarbyl having from 1 to 30 carbon atoms, halogen, alkoxides, aryloxides, amides, phosphides or any other univalent anionic ligand or combination thereof; also, two Q's together form an alkylidene ligand or cyclometallated hydrocarbyl ligand or other divalent anionic chelating ligand, where g is an integer corresponding to the formal oxidation state of M, d is 0, 1, 2, 3, 4 or 5, f is 0 or 1 and e is 1, 2 or 3.

In another preferred embodiment of this invention the catalyst component is represented by the formula (IV):

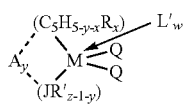

wherein M is Hf; $(C_5H_{5-y-x}R_x)$ is a cyclopentadienyl ring which is substituted with from at least one to 5 substituent groups R, "x" is 1, 2, 3, 4 or 5 denoting the degree of substitution, and at least one R is a non-hydrogen atom, preferably R is at least 3 carbon atoms or silicon atoms or a combination thereof, more preferably R is an alkyl having 3 or more carbon atoms, for example n-propyl or n-butyl, and each additional substituent group R is, independently, a radical selected from a group consisting of $C_1$-$C_{20}$ hydrocarbyl radicals, substituted $C_1$-$C_{20}$ hydrocarbyl radicals wherein one or more hydrogen atoms is replaced by a halogen atom, $C_1$-$C_{20}$ hydrocarbyl-substituted metalloid radicals wherein the metalloid is selected from the Group 14 of the Periodic Table of Elements, and halogen radicals or $(C_5H_{5-y-x}R_x)$ is a cyclopentadienyl ring in which two adjacent R-groups are joined forming $C_4$-$C_{20}$ ring to give a saturated or unsaturated polycyclic cyclopentadienyl ligand such as indenyl, tetrahydroindenyl, fluorenyl or octahydrofluorenyl;

$(JR'_{z-1-y})$ is a heteroatom ligand in which J is an element with a coordination number of three from Group 15 or an element with a coordination number of two from Group 16 of the Periodic Table of Elements, preferably nitrogen, phosphorus, oxygen or sulfur with nitrogen being preferred, and each R' is, independently a radical selected from a group consisting of $C_1$-$C_{20}$ hydrocarbyl radicals wherein one or more hydrogen atoms is replaced by a halogen atom, y is 0 or 1, and "z" is the coordination number of the element J;

each Q is, independently any univalent anionic ligand such as halogen, hydride, or substituted or unsubstituted $C_1$-$C_{30}$ hydrocarbyl, alkoxide, aryloxide, amide or phosphide, provided that two Q may be an alkylidene, a cyclometallated hydrocarbyl or any other divalent anionic chelating ligand;

A is a covalent bridging group containing a Group 15 or 14 element such as, but not limited to, a dialkyl, alkylaryl or diaryl silicon or germanium radical, alkyl or aryl phosphine or amine radical, or a hydrocarbyl radical such as methylene, ethylene and the like;

L' is a Lewis base such as diethylether, tetraethylammonium chloride, tetrahydrofuran, dimethylaniline, aniline, trimethylphosphine, n-butylamine, and the like; and w is a number from 0 to 3. Additionally, L' may be bonded to any of R, R' or Q.

In one embodiment of the bulky ligand hafnium transition metal metallocene-type catalyst compounds described above, at least one bulky ligand is substituted with a substituent having 3 or more carbon atoms, preferably 3 to 20 carbon atoms, more preferably 3 to 10 and most preferably 3 to 5 carbon atoms. In another preferred embodiment, the hafnium transition metal metallocene-type catalyst system has two bulky ligands that are each substituted with a linear or branched, preferably linear, alkyl having 3 or more carbon atoms, preferably 3 to 10 carbon atoms, most preferably 3 to 5 carbon atoms, where at least one bulky ligand is a cyclopentadienyl derived ligand, preferably a cyclopentadienyl ring. In a preferred embodiment the bulky ligands of the hafnium transition metal metallocene are both cyclopentadienyl rings at least one of which is substituted with one or more branched or linear alkyls having 3 or more carbon atoms, preferably both cyclopentadienyl rings are substituted with at least one n-propyl, isopropyl, n-butyl, isobutyl, n-pentyl, or combination thereof. In a more preferred embodiment the hafnium transition metal metallocene-type catalyst compound has two bulky ligands that are each substituted with n-propyl, n-butyl or n-pentyl or combination thereof, in the same or different positions, preferably in the same position on the bulky ligands.

In another preferred embodiment, the hafnium transition metal metallocene-type catalyst system has two bulky ligands that are each substituted with a linear or branched, preferably linear, silyl having 3 or more non-hydrogen atoms, preferably 3 to 10 non-hydrogen atoms, most preferably 3 to 5 non-hydrogen atoms, where at least one bulky ligand is a cyclopentadienyl derived ligand, preferably a cyclopentadienyl ring. In a preferred embodiment the bulky ligands of the hafnium transition metal metallocene are both cyclopentadienyl rings at least one of which is substituted with one or more branched or linear silylalkyls having 3 or more non-hydrogen atoms. In one embodiment, the substituent has at least 3 or more non-hydrogen atoms of which at least one is a silicon atom, for example trimethyl silyl alkyl, tributyl silyl alkyl or tripropyl silyl alkyl or even cyclopropyl silyl. Other non-hydrogen substituent atoms include oxygen and/or nitrogen.

It is contemplated that the substituted bulky ligands of the hafnium transition metal metallocene-type catalyst compound of the invention are asymmetrically substituted in terms of additional substituents or types of substituents, and/or unbalanced in terms of the number of additional substituents on the bulky ligands.

Non-limiting examples of hafnocenes of the invention include bis (n-propyl cyclopentadienyl)hafnium dichloride, dimethyl or dihydride, bis(n-butyl cyclopentadienyl)hafnium dichloride or dimethyl, bis(n-pentyl cyclopentadienyl) hafnium dichloride or dimethyl, (n-propyl cyclopentadienyl) (n-butyl cyclopentadienyl)hafnium dichloride or dimethyl, bis[(2-trimethylsilyl-ethyl)cyclopentadienyl]hafnium dichloride or dimethyl, bis(trimethylsilyl cyclopentadienyl) hafnium dichloride or dimethyl or dihydride, bis(2-n-propyl indenyl)hafnium dichloride or dimethyl, bis(2-n-butyl indenyl)hafnium dichloride or dimethyl, dimethylsilyl bis(n-propyl cyclopentadienyl)hafnium dichloride or dimethyl, dimethylsilyl bis(n-butyl cyclopentadienyl)hafnium dichloride or dimethyl, bis(9-n-propyl fluorenyl)hafnium dichloride or dimethyl, bis(9-n-butyl fluorenyl)hafnium dichloride or dimethyl, (9-n propyl fluorenyl)(2-n-propyl indenyl)hafnium dichloride or dimethyl, bis(1,2-n-propyl, methyl cyclopentadienyl)hafnium dichloride or dimethyl, (n-propyl cyclopentadienyl)(1,3-n-propyl, n-butyl cyclopentadienyl)hafnium dichloride or dimethyl and the like.

In one preferred embodiment the hafnocenes of the invention are unbridged mono- and bis-hafnocenes where a structural bridge is not required for stereorigidty. It is also contemplated that in one embodiment, the hafnocenes of the invention include their structural or optical isomers and mixtures thereof.

For the purposes of this patent specification and appended claims, the term "activator" is defined to be any compound or component which can activate a bulky ligand transition metal metallocene-type catalyst compound as described above, for example, a Lewis acid or a non-coordinating ionic activator or ionizing activator or any other compound that can convert a neutral metallocene catalyst component to a metallocene cation. It is within the scope of this invention to use alumoxane or modified alumoxane as an activator, and/or to also use ionizing activators, neutral or ionic, such as tri(n-butyl)ammonium tetrakis(pentafluorophenyl)boron or a trisperfluorophenyl boron metalloid precursor which ionize the neutral metallocene compound.

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838 and European publications EP-A-0 561 476, EP-B1-0 279 586 and EP-A-0 594-218, and PCT publication WO 94/10180, all of which are herein fully incorporated by reference.

Ionizing compounds may contain an active proton, or some other cation associated with but not coordinated or only loosely coordinated to the remaining ion of the ionizing compound. Such compounds and the like are described in European publications EP-A-0 570 982, EP-A-0 520 732, EP-A-0 495 375, EP-A-0 426 637, EP-A-0 500 944, EP-A-0 277 003 and EP-A-0 277 004, and U.S. Pat. Nos. 5,153,157, 5,198,401, 5,066,741, 5,206,197, 5,241,025, 5,387,568, 5,384,299 and 5,502,124 and U.S. patent application Ser. No. 08/285,380, filed Aug. 3, 1994, all of which are herein fully incorporated by reference. Combinations of activators are also contemplated by the invention, for example, alumoxanes and ionizing activators in combinations, see for example, PCT publications WO 94/07928 and WO 95/14044 and U.S. Pat. Nos. 5,153,157 and 5,453,410 all of which are herein fully incorporated by reference.

In an embodiment of the invention two or more bulky ligand hafnium transition metal metallocene-type catalyst compounds as described above can be combined to form a catalyst system useful in the invention. For example, those mixed catalysts described in U.S. Pat. Nos. 5,281,679, 5,359,015 and 5,470,811, all of which are herein fully incorporated herein reference. In another embodiment of the catalyst system of the invention combinations of one or more of catalyst components of the formulas (III) and/or (IV) are contemplated.

In one embodiment, metallocene catalyst components can be combined to form the blend compositions as described in PCT publication WO 90/03414 published Apr. 5, 1990, herein fully incorporated by reference. In yet another embodiment of the invention mixed metallocenes as described in U.S. Pat. Nos. 4,937,299 and 4,935,474, both are herein fully incorporated herein by reference, can be used to produce polymers having a broad molecular weight distribution and/or a multimodal molecular weight distribution. As a particular aspect of this embodiment of the invention the hafnium metallocene is a bis(n-propylcyclopentadienyl)hafnium dichloride or dimethyl which comprises at least 95 mole % of the transition metal catalyst component and the balance is a bis(n-propylcyclopentadienyl)zirconium dichloride or dimethyl which comprises at least 0.1 mole % of the transition metal catalyst component.

In one embodiment, an ethylene-alpha-olefin copolymer having a density in the range of from about 0.87 g/cc to about 0.940 g/cc is produced by the catalyst system of the invention. In one preferred embodiment, the ethylene-alpha-olefin copolymers of the invention have a density of at least about 0.910 g/cc. These copolymers produced by a catalyst system of this invention are especially well suited for making films having a new balance of film properties as compared to films heretofore produced from commercially available metallocene produced resins such as Dow ELITE™ and/or Exxon EXCEED™ resins of similar densities and melt index (MI) values.

In another embodiment of the invention at least one metallocene catalyst of the invention can be combined with a non-metallocene or traditional Ziegler-Natta catalyst or catalyst system, or chromium based catalysts or catalyst systems, non-limiting examples are described in U.S. Pat. Nos. 4,159,965, 4,325,837, 4,701,432, 5,124,418, 5,077,255, 5,183,867, 5,391,660, 5,395,810 and 5,691,264, all of which are herein fully incorporated by reference.

It is within the scope of this invention that $Ni^{2+}$ and $Pd^{2+}$ complexes described in the articles by Johnson, et al., "New Pd(II)- and Ni(II)-Based Catalysts for Polymerization of Ethylene and a-Olefins", J. Am. Chem. Soc. 1995, 117, 6414-6415 and "Copolymerization of Ethylene and Propylene with Functionalized Vinyl Monomers by Palladium(II) Catalysts", J. Am. Chem. Soc., 1996, 118, 267-268, and WO 96/23010 published Aug. 1, 1996, which are all herein fully incorporated by reference, can be used as catalysts in combination with the hafnocenes of the invention. These complexes can be either dialkyl ether adducts, or alkylated reaction products of the described dihalide complexes that can be activated to a cationic state by the activators of this invention. It is also within the scope of the process of this invention that the above described complexes can be combined with one or more of the catalyst compounds represented by formula (III) and (IV), with one or more activators, and with one or more of the support materials using one of the support methods that are described below.

For purposes of this patent specification the terms "carrier" or "support" are interchangeable and can be any support material, preferably a porous support material, for example, talc, inorganic oxides, inorganic chlorides, and magnesium chloride, and resinous support materials such as polystyrene or polystyrene divinyl benzene polyolefins or polymeric compounds or any other organic or inorganic support material and the like, or mixtures thereof.

The preferred support materials are inorganic oxide materials, which include those of Groups 2, 3, 4, 5, 13 or 14 metal oxides. In a preferred embodiment, the catalyst support materials include silica, alumina, silica-alumina, and mixtures thereof. Other inorganic oxides that may be employed either alone or in combination with the silica, alumina or silica-alumina and magnesia, titania, zirconia, and the like.

It is preferred that the carrier of the catalyst of this invention has a surface area in the range of from about 10 to about 700 $m^2$/g, pore volume in the range of from about 0.1 to about 4.0 cc/g and average particle size in the range of from about 10 to about 500 μm. More preferably, the surface area is in the range of from about 50 to about 500 $m^2$/g, pore volume of from about 0.5 to about 3.5 cc/g and average particle size of from about 20 to about 200 μm. Most preferably the surface area range is from about 100 to about 400 $m^2$/g, pore volume from about 0.8 to about 3.0 cc/g and average particle size is from about 20 to about 100 μm. The average pore size of the carrier of the invention typically has pore size in the range of from 10 to 1000 Å, preferably 50 to about 500 Å, and most preferably 75 to about 350 Å.

The catalyst system of the invention can be made and used in a variety of different ways as described below. In one embodiment the catalyst is unsupported, preferably in liquid form such as described in U.S. Pat. Nos. 5,317,036 and 5,693,727 and European publication EP-A-0 593 083, all of which are herein incorporated by reference. In the preferred embodiment, the catalyst system of the invention is supported. Examples of supporting the catalyst system used in the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847 and 5,665,665 and U.S. application Ser. Nos. 271,598 filed Jul. 7, 1994 and 788,736 filed Jan. 23, 1997 and PCT publications WO 95/32995, WO 95/14044, WO 96/06187 and WO 97/02297 all of which are herein fully incorporated by reference.

In another embodiment, the catalyst system of the invention contains a polymer bound ligand as described in U.S. Pat. No. 5,473,202 which is herein fully incorporated by reference. In one embodiment the catalyst system of the invention is spray dried as described in U.S. Pat. No. 5,648,310 which is fully incorporated herein by reference. In an embodiment the support of the invention is functionalized as described in European publication EP-A-0 802 203 or at least one substituent or leaving group is selected as described in U.S. Pat. No. 5,688,880, both of which are herein fully incorporated by reference.

In one embodiment of the process of the invention, olefin(s), preferably $C_2$ to $C_{30}$ olefin(s) or alpha-olefin(s), preferably ethylene or propylene or combinations thereof are prepolymerized in the presence of the catalyst or catalyst system of the invention prior to the main polymerization. The prepolymerization can be carried out batchwise or continuously in gas, solution or slurry phase including at elevated pressures. The prepolymerization can take place with any alpha-olefin monomer or combination and/or in the presence of any molecular weight controlling agent such as hydrogen. For details on prepolymerization see U.S. Pat. Nos. 4,923,833, 4,921,825 and 5,283,278 and European publication EP-B-0279 863 all of which are herein fully incorporated by reference.

In another embodiment of the invention, the supported catalyst system of the invention includes an antistatic agent or surface modifier, for example, those described in U.S. Pat. No. 5,283,278 and PCT publication WO 96/11960 which are herein fully incorporated by reference. Non-limiting examples of antistatic agents and surface modifiers include alcohol, thiol, silanol, diol, ester, ketone, aldehyde, acid, amine, and ether compounds. Tertiary amines, ethoxylated amines, and polyether compounds are preferred. The antistatic agent can be added at any stage in the formation of the supported catalyst system of the invention, however, it is preferred that it is added after the supported catalyst system of the invention is formed, in either a slurry or dried state.

A preferred method for producing the catalyst of the invention is described below and can be found in U.S. application Ser. Nos. 265,533, filed Jun. 24, 1994 and 265,532, filed Jun. 24, 1994 and PCT publications WO 96/00245 and WO 96/00243 both published Jan. 4, 1996, all of which are herein fully incorporated by reference. In a preferred embodiment, the metallocene-type catalyst component is slurried in a liquid to form a metallocene solution and a separate solution is formed containing an activator and a liquid. The liquid can be any compatible solvent or other liquid capable of forming a solution or the like with at least one metallocene catalyst component and/or at least one activator. In the preferred embodiment the liquid is a cyclic aliphatic or aromatic hydrocarbon, most preferably toluene. The metallocene and activator solutions are mixed together and added to a porous support or the porous support is added to the solutions such that the total volume of the metallocene solution and the activator solution or the metallocene and activator solution is less than four times the pore volume of the porous support, more preferably less than three times, even more preferably less than two times; preferred ranges being from 1.1 times to 3.5 times range and most preferably in the 1.2 to 3 times range.

Procedures for measuring the total pore volume of a porous support are well known in the art. Details of one of these procedures is discussed in Volume 1, *Experimental Methods in Catalytic Research* (Academic Press, 1968) (specifically see pages 67-96). This preferred procedure involves the use of a classical BET apparatus for nitrogen absorption. Another method well know in the art is described in Innes, *Total Porosity and Particle Density of Fluid Catalysts By Liquid Titration*, Vol. 28, No. 3, Analytical Chemistry 332-334 (March, 1956).

The mole ratio of the metal of the activator component to the transition metal of the metallocene component is in the range of ratios between 0.3:1 to 1000:1, preferably 20:1 to 800:1, and most preferably 50:1 to 500:1. Where the activator is an aluminum-free ionizing activator such as those based on the anion tetrakis(pentafluorophenyl)boron, the mole ratio of the metal of the activator component to the transition metal component is preferably in the range of ratios between 0.3:1 to 3:1.

In another embodiment the catalyst loading in millimoles (mmoles) of metallocene to weight of support catalyst in grams (g) is in the range of from about 0.001 to about 2.0 mmoles of metallocene per g of support material, preferably from about 0.005 to about 1.0, more preferably from about 0.005 to 0.5 and most preferably from about 0.01 to 0.05.

In one embodiment, the catalyst of the invention has a catalyst productivity of greater than 1000 grams of polymer per gram of the metallocene catalyst, preferably greater than 1400 grams of polymer per gram of metallocene catalyst, more preferably greater than 1800 grams of polymer per gram of metallocene catalyst, even more preferably greater than 2000 grams of polymer per gram of metallocene catalyst, and most preferably greater than 2500 grams of polymer per gram of metallocene catalyst.

Polymerization Process

The substituted bulky ligand hafnium transition metal metallocene-type catalyst compounds and catalyst systems of this invention are suited for the polymerization of monomers, and optionally one or more comonomers, in any polymerization process, solution phase, gas phase or slurry phase, most preferably a gas or slurry phase process is used.

In an embodiment, this invention is directed toward the solution, slurry or gas phase polymerization or copolymerization reactions involving the polymerization of one or more of the monomers having from 2 to 30 carbon atoms, preferably 2-12 carbon atoms, and more preferably 2 to 8 carbon atoms. The invention is particularly well suited to the copolymerization reactions involving the polymerization of one or more of the monomers, for example alpha-olefin monomers of ethylene, propylene, butene-1, pentene-1,4-methyl-pentene-1, hexene-1, octene-1, decene-1, and cyclic olefins such as cyclopentene, and styrene or a combination thereof. Other monomers can include polar vinyl monomers, diolefins such as dienes, polyenes, norbornene, norbornadiene, acetylene and aldehyde monomers. Preferably a copolymer of ethylene or propylene is produced. Preferably the comonomer is an alpha-olefin having from 3 to 15 carbon atoms, preferably 4 to 12 carbon atoms and most preferably 4 to 8 carbon atoms. In another embodiment ethylene or propylene is polymerized with at least two different comonomers to form a terpolymer and the like, the preferred comonomers are a combination of alpha-olefin monomers having 3 to 10 carbon atoms, more preferably 4 to 8 carbon atoms.

In another embodiment ethylene or propylene is polymerized with at least two different comonomers to form a terpolymer and the like, the preferred comonomers are a combination of alpha-olefin monomers having 3 to 10 carbon atoms, more preferably 3 to 8 carbon atoms, optionally with at least one diene monomer. The preferred terpolymers include the combinations such as ethylene/butene-1/hexene-1, ethylene/propylene/butene-1, propylene/ethylene/butene-1, propylene/ethylene/hexene-1, ethylene/propylene/norbornadiene and the like.

In the most preferred embodiment the process of the invention relates to the polymerization of ethylene and at least one comonomer having from 4 to 8 carbon atoms. Particularly, the comonomers are butene-1, 4-methyl-pentene-1, hexene-1 and octene-1, the most preferred being hexene-1.

Typically in a gas phase polymerization process a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. The reactor pressure may vary from about 100 psig (680 kpag) to about 500 psig (3448 kPag), preferably in the range of from about 200 psig (1379 kpag) to about 400 psig (2759 kpag), more preferably in the range of from about 250 psig (1724 kpag) to about 350 psig (2414 kpag). The reactor temperature may vary between about 60° C. and about 120° C., preferably about 60° C. to about 115° C., and more preferably in the range of from about 70° C. to 110° C., and most preferably in the range of from about 70° C. to 95° C. The settled bulk density for the polymers produced by the process of invention are in the range of from about 10 to 35 lb/ft$^3$ (160 to 561 kg/m$^3$), preferably from about 12 to 35 lb/ft$^3$ (193 to 561 kg/m$^3$), more preferably from about 14 to 32 lb/ft$^3$ (224 to 513 kg/m$^3$), and most preferably from about 15 to 30 lb/ft$^3$ (240 to 481 kg/m$^3$).

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

A preferred process of the invention is where the process, preferably a slurry or gas phase process, most preferably a gas phase process, is operated in the absence of or essentially free of any scavengers, such as triethylaluminum, trimethylaluminum, tri-isobutylaluminum and tri-n-hexylaluminum and diethyl aluminum chloride and the like. This preferred process is described in PCT publication WO 96/08520, which is herein fully incorporated by reference.

A slurry polymerization process generally uses pressures in the range of about 1 to about 50 atmospheres and even greater and temperatures in the range of 0° C. to about 200° C. In a slurry polymerization, a suspension of solid, particulate polymer is formed in a liquid polymerization medium to which ethylene and comonomers and often hydrogen along with catalyst are added. The liquid employed in the polymerization medium can be alkane or cycloalkane, or an aromatic hydrocarbon such as toluene, ethylbenzene or xylene. The medium employed should be liquid under the conditions of polymerization and relatively inert. Preferably, hexane or isobutane medium is employed.

In one embodiment a preferred polymerization technique of the invention is referred to as a particle form, or slurry process where the temperature is kept below the temperature at which the polymer goes into solution. Such technique is well known in the art, see for instance U.S. Pat. No. 3,248,179 which is fully incorporated herein by reference. The preferred temperature in the particle form process is within the range of about 185° F. (85° C.) to about 230° F. (110° C.). Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

It is also contemplated in an embodiment of the invention, that the process is a multistage polymerization process where one reactor is operating in slurry phase that feeds into a reactor operating in a gas phase as described in U.S. Pat. No. 5,684,097, which is fully incorporated herein by reference.

In one embodiment the reactor utilized in the present invention is capable of producing greater than 500 lbs/hr (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

The productivity of the catalyst or catalyst system is influenced by the main monomer partial pressure. The preferred mole percent of the main monomer, ethylene or propylene, preferably ethylene is from about 25 to 90 mole percent and the monomer partial pressure is in the range of from about 75 psia (517 kPa) to about 300 psia (2069 kPa), which are typical conditions in a gas phase polymerization process.

In another embodiment of the invention where the hafnocene of the invention is in particular an unbridged metallocene-type catalyst, the process of the invention is capable of producing a polymer product having a melt index of less than 0.1 dg/min without the addition of hydrogen to the process.

Polymer Product of the Invention

The polymers produced by this invention can be used in a wide variety of products and end-use applications. The polymers typically have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.910 g/cc, preferably greater than 0.915 g/cc. The polymers of the invention typically have a narrow molecular weight distribution, a weight average molecular weight to number average molecular weight ($M_w/M_n$) of greater than 1.5 to about 4, particularly greater than 2 to about 3, more preferably greater than about 2.2 to less than 3. Also, the polymers of the invention typically have a narrow composition distribution. In another embodiment, the polymers produced by the process of the invention, particularly in a slurry and gas phase process, contain less than 5 ppm hafnium, generally less than 2 ppm hafnium, preferably less than 1.5 ppm hafnium, more preferably less than 1 ppm hafnium. In an embodiment, the polymer of the invention contains in the range of from about 0.01 ppm to about 2 ppm hafnium, preferably in the range of from about 0.01 ppm to about 1.5 ppm hafnium, more preferably in the range of from about 0.01 ppm to 1 or less ppm hafnium.

Polymers produced by the process of the invention are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

In one embodiment of this invention the polymerization product is a linear low-density polyethylene (LLDPE) resin produced by polymerization of ethylene and an alpha-olefin comonomer having from 3 to 20 carbon atoms, preferably hexene-1. The ethylene copolymers of the invention have from 1 to about 5 mole % alpha-olefin comonomer incorporated into the copolymer. For LLDPE resins of the invention, the ethylene copolymer typically has a polymer density greater than or equal 0.910 g/cc, preferably greater than or equal to 0.915 g/cc, and a polymer weight average molecular weight $\geq 25,000$. In a preferred embodiment, the ethylene alpha-olefin copolymers of the invention are produced with a catalyst system having a hafnocene component of at least 95 mole % of all transition metal compound component and the balance is a zirconocene of comparable ligand structure that comprises at least about 0.1 mole % of the transition metal compound component of the catalyst. In another embodiment of this invention, the resins, particularly the LLDPE resins so produced by a catalyst system of this invention is thereafter converted into a article of manufacture, especially a film. A catalyst component as above described may be produced from a $HfCl_4$ reagent for production of the transition metal compound catalyst component which either has at least from about 0.1 mole % up to about 5 mole % of a $ZrCl_4$ contaminant, or otherwise $ZrCl_4$ is added to the $HfCl_4$ reagent in an amount sufficient to make up this mole % requirement for the transition metal compound component of the overall catalyst system.

In one embodiment of this invention, a hafnium metallocene compound as previously described, but having a minor content of a zirconocene compound of comparable structure is utilized as the transition metal component for a catalyst system in supported form for the production of the ethylene copolymer of the invention, especially a linear low density polyethylene resin. Typically the minor amount of zirconium metallocene is in the range of 0.1 to 4 mole % as is typically the concentration of a zirconium tetrachloride contaminant in a hafnium tetrachloride reagent from which the transition metal component for the catalyst system is made. If the zirconium component is present in an insufficient amount, then the content of this zirconium component in the hafnium reagent for catalyst production may be increased by direct addition of the desired quantity of zirconium tetrachloride.

Any of the known activators as previously described may be used to activate the transition metal compound that is predominantly a hafnocene with a small content of zirconocene to an active catalytic state. Although this catalyst system may be used in any mode for olefin polymerization—solution, solvent, slurry, or gas phase—since slurry and gas phase polymerization are preferred modes for production of the LLDPE resins, preferably the catalysts is in supported form, preferably on a silica support.

The monomer supplied to the polymerization zone is regulated to provide a ratio of ethylene to alpha-olefin comonomer in proportion so as to yield a polyethylene of comonomer content, as a bulk measurement, preferably of from about 0.5 to about 5.0 mole % comonomer, to yield in bulk a resin of density preferably of from about 0.95 g/cc to about 0.915 g/cc. The reaction temperature, monomer residence time, and catalyst system component quantities molecular weight control agent (such as $H_2$) are regulated so as to provide a resin, preferably a LLDPE resin of weight average molecular weight from about 25,000 to about 150,000, a number average molecular weight from about 3500 to about 60,000, preferably to about 50,000, so as to provide the resin, preferably a LLDPE resin, a molecular weight distribution value of from about 2.5 to about 7, preferably from about 3 to 7.

A ethylene copolymer so produced with the hafnium based catalyst system (having 0.1 to 4 mole % zirconium analog structure) in a single reactor, preferably a gas phase reactor, possessed unique molecular characteristics among which are a broadened molecular weight distribution (MWD) and a polymodal CD. Such ethylene copolymers are more easily extruded into film products by cast or blown bubble film processing techniques with lower motor load, higher throughput and reduced head pressure as compared to EXCEED™ resins of comparable comonomer type and density. Such ethylene copolymers, particularly the LLDPE resins of the invention, have for a comparable MI a higher weight average molecular weight and a broader MWD than does an EXCEED™ resin. For cast film production with a resin of about 2.0 to about 5.0 MI, and preferably about 3 MI, the LLDPE has a greater melt strength and higher break velocity than that of an EXCEED™ resin and the LLDPE cast film has a new balance of stiffness and toughness and generally improved balance of tear and dart properties. For a resin of about 0.5 to about 2.0 MI, and preferably of about MI=1.0, converted into film by a blown bubble technique, the LLDPE resin has, by comparison to a blown film produced from an EXCEED™ resin, a higher 1% secant modulus in the transverse direction and improved dart properties. In both cases the LLDPE resin has a higher energy specific output (ESO) value by comparison to an EXCEED™ resin for conversion of it into a film.

Hence, because of the higher activity of the hafnocenes here described, it is now possible to practically produce the ethylene copolymers of the invention, especially the LLDPE resins of the invention, in a single gas phase reactor as described above and such LLDPE resins are particularly well suited to the processing into film articles by cast and blown film procedures.

Further characteristics of the LLDPE resins described above which distinguishes these LLDPE resins from EXCEED™ type resins is that under temperature rising elution fractionation (TREF) analysis these LLDPE resins evidence two peaks whereas an EXCEED™ type resin evidences but a single peak. In the ethylene copolymers of the invention, particularly the LLDPEs of this invention, TREF analysis exhibits a low-temperature (low-T) peak position at 45-75° C., and preferably at about 65° C.; a peak separation between the low-T and high-temperature (high-T) peaks of a minimum of about 20° C. and a maximum of about 35° C. with a preferred peak separation of about 25° C. Using a Gaussian fit to the TREF via multiple-peak method (a generic mathematical model) shows that the low-T peak which is also the low density fraction ranges from about 10 mole % to a maximum of about 90 mole % and in a preferred LLDPE resin the low low-T peak is preferably about 30 mole % and the high-T peak is about 70 mole %. For a LLDPE as above described with hexene as comonomer the total comonomer content may range from about 1 to about 5 mole % and preferably is about 3 mole % (at which its ASTM density is about 0.918 g/cc). LLDPEs as above described with hexene in particular as the comonomer will exhibit a weight average molecular weight of about 25,000 to 150,000 at corresponding MI values that range between about 10 to about 0.1 MI, and preferably the weight average molecular weight ranges from about 80,000 to 110,000 within which range the melt index respectively ranges from a value of about 3 to about 1. For such LLDPE resins the melt index ratio (MIR) ($I_{21}/I_2$ as measured by ASTM standard procedures) is greater than 15 to about 100, preferably in the range of from 18 to 50, more preferably in the range of from about 20 to less than about 40 and most preferably from about 23 to about 35; the molecular weight distribution (MWD) is at least about 2.5 and at most 7, preferably from about 3 to 7; and the $M_z/M_w$ ratio is at least 2 and at most about 3.5 and preferably is about 2.8.

Cast films produced from such LLDPE resin resins having an MI of 2 to 4 will have a 1% secant modulus greater than 14.5 kpsi film layer and less than 21 kpsi, a machine direction tear of greater than 100 g/mil and less than 600 g/mil, a transverse direction tear of greater than 100 g/mil and less than 1000 g/mil, a 26" dart value greater than 100 g/mil and less than 1400 g/mil. Such cast film will also have a machine direction tensile at break greater than 7 kpsi (48 kPa) and less than 11 kpsi (76 kPa), a transverse direction tensile at break greater than 5 kpsi (34 kPa) and less than 6.5 kpsi (45 kPa), a machine direction elongation at break greater than 325% and less than 600%, a transverse direction at break greater than 550% and less than 750%. Blown films produced from such LLDPE resins having an MI of 0.5 to 2.0 will have a 1% secant modulus greater than 26 kpsi (179 kPa) and less than 33 kpsi (227 kPa) and a 26" dart value greater than 1200 g/mil.

EXAMPLES

In order to provide a better understanding of the present invention including representative advantages thereof, the following examples are offered.

The properties of the polymer were determined by the following test methods:

Density is measured in accordance with ASTM-D-1238.

MWD, or polydispersity, is a well-known characteristic of polymers. MWD is generally described as the ratio of the weight average molecular weight (Mw) to the number average molecular weight ($M_n$). The ratio of $M_w/M_n$ can be measured by gel permeation chromatography techniques, or indirectly, by measuring the ratio (MIR) of I21 to I2 (melt index) as described in ASTM D-1238-F and ASTM D-1238-E respectively.

In all the Examples below the methylalumoxane (MAO) is a 30 weight percent MAO solution in toluene available from Albemarle Corporation, Baton Rouge, La., the Davison 948 silica is available from W.R. Grace, Davison Chemical Division, Baltimore, Md. and the N,N-bis(2-hydroxyethyl)octadecylamine is available as Kemamine AS-990 from ICI Specialties, Wilmington, Del. The metallocene components of the examples were prepared in accordance with procedures well known in the art.

Example 1

Preparation of Catalyst

A solution of methylalumoxane and metallocene was formed by adding 11 cm$^3$ of 30 wt-% MAO solution in toluene onto 0.202 g of bis(n-propylcyclopentadienyl)hafnium dichloride in a vial. 40 cm$^3$ of fresh toluene was added, and the mixture stirred for 1 hour at 25° C. This pre-mixed solution of the MAO and the metallocene was then added onto 10 g of Davison 948 silica dried to 600° C. The resulting slurry was stirred for 1.5 hours at 25° C. The final catalyst was then dried to free-flowing powder under vacuum at 65° C.
Polymerization A sample of the dry catalyst formed in the above Example 1 was then used in a polymerization process of ethylene/1-butene in a 2-liter semi-batch gas-phase reactor at 85° C. The pressure in the reactor, about 155 psig (1069 kpag), was held constant by continuously feeding 5 mol-% 1-butene in ethylene to compensate for any pressure changes due to polymerization. After 1 h (hour), the polymer formed was separated from the seed bed material and analyzed for the molecular properties shown in Table 1 below as Run 1 and 2.

Example 2

Preparation of Catalyst

A solution of methylalumoxane and metallocene was formed by adding 66.5 cm$^3$ of 30 wt-% MAO solution in toluene onto 1.21 g of bis(n-propylcyclopentadienyl)hafnium dichloride in a vial. 50 cm$^3$ of fresh toluene was added, and the mixture stirred for 1.5 hours at 25° C. This pre-mixed solution of the MAO and the metallocene was then added onto 60 g of Davison 948 silica dried to 600° C. The resulting slurry was stirred for 1.5 hours at 25° C. Then a solution of 0.41 g of N,N-bis(2-hydroxyethyl)octadecylamine in 50 cm$^3$ toluene was added, and stirring continued for another 30 minutes. The final catalyst was then dried to free-flowing powder under vacuum at 65° C.
Polymerization A sample of the dry catalyst formed in Example 2 was then used in a polymerization process of ethylene/1-butene in a 2-liter semi-batch gas-phase reactor at 85° C. The pressure in the reactor, about 158 psig (1089 kpag), was held constant by continuously feeding 5 mol-% 1-butene in ethylene to compensate for any pressure change due to polymerization. After 1 h, the polymer formed was separated from the seed bed material and analyzed for the molecular properties shown as Run 3 in Table 1 below.

Example 3

Preparation of Catalyst

Methylalumoxane (MAO) (1155 cm$^3$ of 30 wt-% solution in toluene) was charged into a 2-gallon reaction vessel. 1970 cm$^3$ of fresh toluene was added. Then a solution of 20.2 g of bis(n-propylcyclopentadienyl)hafnium dichloride in 355 cm$^3$ toluene was added. The temperature was maintained at 27° C.

and the mixture stirred for 1.5 hour. A 1000 g of a Davison 948 silica dehydrated at 600° C. was charged into a 2-gallon reaction vessel at 27° C. The solution of methylalumoxane and metallocene from above was added onto the silica in two equal portions. Then an additional 250 cm³ toluene was added to the slurry. After 1 hour, a solution of 6.7 g of N,N-bis(2-hydroxylethyl)octadecylamine in 70 cm³ toluene was added and stirring continued for another 20 minutes. The final catalyst was then dried to free-flowing powder at 68° C. under vacuum.

Polymerization

Samples of the dry catalyst formed in Example 3 each were then used in a polymerization process of ethylene/1-butene in a 2-liter semi-batch gas-phase reactor at 85° C. The pressure in the reactor, about 158 psig (1089 kPag), was held constant by continuously feeding 5 mol-% 1-butene in ethylene to compensate for any pressure change due to polymerization. After 1 h, the polymer formed was separated from the seed bed material and analyzed for the molecular properties shown as Runs 4-6 in Table 1 below.

Example 4

Preparation of Catalyst

A solution of methylalumoxane and metallocene was formed by adding 27.8 cm³ of 30 wt-% MAO solution in toluene onto 0.536 g of bis(n-butylcyclopentadienyl)hafnium dichloride in a vial. 60 cm³ of fresh toluene was added, and the mixture stirred for 1.5 hours at 25° C. This pre-mixed solution of the MAO and the metallocene was then added onto 25 g of Davison 948 silica dried to 600° C. The resulting slurry was stirred for 1.5 hours at 25° C. Then a solution of 0.166 g of N,N-bis(2-hydroxylethyl)octadecylamine in 40 cm³ toluene was added, and stirring continued for another 30 minutes. The final catalyst was then dried to free-flowing powder under vacuum at 65° C.

Polymerization

Samples of the dry catalyst formed in Example 4 then were each used in a polymerization process of ethylene/1-butene in a 2-liter semi-batch gas-phase reactor at 85° C. The pressure in the reactor, about 155 psig (1069 kpag), was held constant by continuously feeding 5 mol-% 1-butene in ethylene to compensate for any pressure change due to polymerization. After 1 h, the polymer formed was separated from the seed bed material and analyzed for the molecular properties shown as Runs 7-9 in Table 1 below.

Comparative Example 5

Preparation of Catalyst

A solution of methylalumoxane and metallocene was formed by adding 27.7 cm³ of 30 wt-% MAO solution in toluene onto 0.413 g of bis (cyclopentadienyl)hafnium dichloride in a vial. 50 cm³ of fresh toluene was added, and the mixture stirred for 1.5 hours at 25° C. This pre-mixed solution of the MAO and the metallocene was then added onto 25 g of Davison 948 silica dried to 600° C. The resulting slurry was stirred for 1.5 hours at 25° C. Then a solution of 0.166 g of N,N-bis(2-hydroxylethyl)octadecylamine in 40 cm³ toluene was added, and stirring continued for another 30 minutes. The final catalyst was then dried to free-flowing powder under vacuum at 65° C.

Polymerization

Samples of the dry catalyst formed in Comparative Example 5 were then each used in a polymerization process of ethylene/1-butene in a 2-liter semi-batch gas-phase reactor at 85° C. The pressure in the reactor, about 158 psig (1089 kPag), was held constant by continuously feeding 5 mol-% 1-butene in ethylene to compensate for any pressure change due to polymerization. After 1 h, the polymer formed was separated from the seed bed material and analyzed for the molecular properties shown as Runs C1 and C2 in Table 1 below.

Comparative Example 6

Preparation of Catalyst

A solution of methylalumoxane and metallocene was formed by adding 27.8 cm³ of 30 wt-% MAO solution in toluene onto 0.444 g of bis (methylcyclopentadienyl)hafnium dichloride in a vial. 60 cm³ of fresh toluene was added, and the mixture stirred for 1.5 hours at 25° C. This pre-mixed solution of the MAO and the metallocene was then added onto 25 g of Davison 948 silica dried to 600° C. The resulting slurry was stirred for 1.5 hours at 25° C. Then a solution of 0.169 g of N,N-bis(2-hydroxylethyl)octadecylamine in 50 cm³ toluene was added, and stirring continued for another 30 minutes. The final catalyst was then dried to free-flowing powder under vacuum at 65° C.

Polymerization

A sample of the dry catalyst formed in Comparative Example 6 was then used in a polymerization process of ethylene/1-butene in a 2-liter semi-batch gas-phase reactor at 85° C. The pressure in the reactor, about 154 psig (1062 kPag), was held constant by continuously feeding 5 mol-% 1-butene in ethylene to compensate for pressure changes due to polymerization. After 1 h, the polymer formed was separated from the seed bed material and analyzed for the molecular properties shown as Run C3 in Table 1 below.

Comparative Example 7

Preparation of Catalyst

A solution of methylalumoxane and metallocene was formed by adding 27.8 cm³ of 30 wt-% MAO solution in toluene onto 0.475 g of bis (ethylcyclopentadienyl)hafnium dichloride in a vial. 60 cm³ of fresh toluene was added, and the mixture stirred for 1.5 hours at 25° C. This pre-mixed solution of the MAO and the metallocene was then added onto 25 g of Davison 948 silica dried to 600° C. The resulting slurry was stirred for 1.5 hours at 25° C. Then a solution of 0.167 g of N,N-bis(2-hydroxylethyl)octadecylamine in 50 cm³ toluene was added, and stirring continued for another 30 minutes. The final catalyst was then dried to free-flowing powder under vacuum at 65° C.

Polymerization

A sample of the dry catalyst formed above in Comparative Example 7 was then used in a polymerization process of ethylene/1-butene in a 2-liter semi-batch gas-phase reactor at 85° C. The pressure in the reactor, about 160 psig (1103 kpag), was held constant by continuously feeding 5 mol-% 1-butene in ethylene to compensate for any pressure change due to polymerization. After 1 h, the polymer formed was separated from the seed bed material and analyzed for the molecular properties shown as Run C4 in Table 1 below.

Comparative Example 8

Preparation of Catalyst

A solution of methylalumoxane and metallocene was formed by adding 28 cm³ of 30 wt-% MAO solution in toluene onto 0.585 g of Me₂Si (Indenyl)₂ hafnium dichloride in a vial. 60 cm³ of fresh toluene was added, and the mixture stirred for 1.5 hours at 25° C. This pre-mixed solution of the MAO and the metallocene was then added onto 25 g of Davison 948 silica dried to 600° C. The resulting slurry was stirred for 1.5 hours at 25° C. Then a solution of 0.167 g of N,N-bis(2-hydroxylethyl)octadecylamine in 40 cm³ toluene was added, and stirring continued for another 30 minutes. The final catalyst was then dried to free-flowing powder under vacuum at 65° C.

Polymerization

Samples of the dry catalyst formed above in Comparative Example 8 were then each used in a polymerization process of ethylene/1-butene in a 2-liter semi-batch gas-phase reactor at 85° C. The pressure in the reactor, about 158 psig (1089 kpag), was held constant by continuously feeding 5 mol-% 1-butene in ethylene to compensate for any pressure change due to polymerization. After 1 h, the polymer formed was separated from the seedbed material and analyzed for the molecular properties shown as Runs $C_5$-$C_7$ in Table 1 below.

silica in two equal portions. Then an additional 250 cm³ of toluene was added to the slurry. After 1 hour, as an antistatic agent, 6.71 g of N,N-bis(2-hydroxyethyl)octadecylamine in 85 cm³ toluene was added and stirring continued for another 20 minutes. The final catalyst was then dried to a free-flowing powder under vacuum for 12 hours of drying time. Theoretical solids (dry wt) recovery is 1337 g; actual final yield (dry wt) was 1160.6 g for an 87% recovery. Of these solids 11.11 wt % was Al, the Al to transition metal molar ratio was 125 and the transition metal loading as Hf was 0.66 wt % and as Zr was 0.003 wt %.

Polymerization

Samples of the dry catalyst formed in Example 9 were then used in a polymerization process of ethylene/1-hexene in a pilot plant semi-batch gas-phase reactor at 85° C. under conditions and with results as reported in Table 2 below.

TABLE 1

| Run # | Catalyst (mg) | Polymer Yield (g) | Activity[1] | Density (g/cc) | $I_2$ (dg/min) | $I_{21}$ (dg/min) | Mw | MWD |
|---|---|---|---|---|---|---|---|---|
| (nPrCp)₂HfCl₂ | | | | | | | | |
| 1 | 100 | 211 | 2126 | 0.9061 | 0.096 | 2.26 | 278942 | 2.88 |
| 2 | 50 | 117 | 2363 | 0.9025 | 0.089 | 2.5 | 275100 | 2.61 |
| 3 | 50 | 136 | 2674 | NM | NM | 1.83 | NM | NM |
| 4 | 50 | 159 | 3159 | 0.9064 | NM | 1.76 | 283282 | 2.82 |
| 5 | 50 | 117 | 2325 | 0.9091 | NM | 1.77 | 272925 | 2.80 |
| 6 | 50 | 117 | 2356 | 0.9081 | NM | 2.0 | 316801 | 2.88 |
| (nBuCp)₂HfCl₂ | | | | | | | | |
| 7 | 150 | 271 | 1821 | 0.9057 | NM | 1.2 | 322890 | 2.46 |
| 8 | 150 | 225 | 1479 | 0.9056 | NM | 0.83 | NM | NM |
| 9 | 100 | 195 | 1935 | 0.9070 | NM | 1.51 | NM | NM |
| (Cp)₂HfCl₂ | | | | | | | | |
| C1 | 300 | 12 | 40 | 0.9310 | NM | 0.42 | 361692 | 3.98 |
| C2 | 500 | 18 | 36 | 0.9273 | NM | 0.67 | NM | NM |
| (MeCp)₂HfCl₂ | | | | | | | | |
| C3 | 150 | 17 | 112 | 0.9234 | NM | 0.68 | 291412 | 3.24 |
| (EtCp)₂HfCl₂ | | | | | | | | |
| C4 | 150 | 16 | 107 | 0.9275 | NM | 0.36 | 375772 | 3.20 |
| Me₂Si(Ind)₂HfCl₂ | | | | | | | | |
| C5 | 150 | 7 | 48 | 0.9365 | NM | 1.74 | 232475 | 3.44 |
| C6 | 150 | 6 | 37 | 0.9265 | NM | 1.21 | 263758 | 4.16 |
| C7 | 500 | 25 | 49 | 0.9239 | NM | 1.73 | 239161 | 3.40 |

Note
[1]Catalyst activity expressed as $g_{PE}/(g_{CAT} \cdot h \cdot 150\ psi)$
NM—Not Measured; "Ind" is indenyl

Example 9

Preparation of Catalyst

Methylalumoxane (1155 cm³ of 30 wt % solution in toluene) was charged into a 2-gallon reaction vessel. 1970 cm³ of fresh toluene was added. Then a solution of 20.17 g of a bis(n-propyl cyclopentadienyl) transition metal dichloride, wherein the transition metal comprised 99.1 mole % Hf (hafnocene) and 0.9 mole % Zr (zirconocene), in 250 cm³ toluene was added. The temperature was maintained at 27° C. and the mixture was stirred for 1.5 hours. 998.8 g of a Crossfield 40/600 C silica (dehydrated a 600° C.) was charged into a 2-gallon reaction vessel at 27° C. The solution of methylalumoxane and metallocene from above was added onto the

TABLE 2

| | RUN NUMBER | | |
|---|---|---|---|
| | 3-14 | 3-15 | 3-16 |
| Reaction Temperature (° C.) (averaged) | 85 | 85 | 85 |
| Run Time (hrs) | 58 | 35 | 41 |
| Number Bed Turnovers | 19.01 | 5.97 | 3.35 |
| Catalyst Feed Rate | 30 | 26 | 22 |
| Reaction Atmosphere | | | |
| $H_2$ (ppm) | 508.2 | 554.9 | 171.9 |
| Ethylene (mole %) | 70.0 | 69.9 | 66.1 |
| 1-Hexene (mole %) | 1.02 | 1.01 | 1.02 |
| Nitrogen (mole %) | 28.98 | 29.09 | 32.88 |

TABLE 2-continued

|  | RUN NUMBER | | |
| --- | --- | --- | --- |
|  | 3-14 | 3-15 | 3-16 |
| Pressure (psig) | 300/2067 | 300/2067 | 300/2067 |
| Production Rate (lbs/hr) | 58.8/24 | 63.5/26 | 59.8/24 |
| Specific Activity (g/g-hr-atm) | 60 | 64 | 53 |
| Polymer Properties |  |  |  |
| MI (g/10 min.) | 1.11 | 3.39 | 0.11 |
| MIR | 24.82 | 23.17 | 28.17 |
| Density (g/cc) | 0.9162 | 0.9175 | 0.9115 |
| Bulk Density (g/cc) | 0.4088 | 0.4036 | 0.4048 |
| Ash (ppm) | 243 | 229 | 292 |
| Hf (ppm) | 1.281 | 1.263 | 1.619 |
| Al (ppm) | 17.4 | 14.9 | 19.9 |

Example 10

Quantities of the ethylene copolymer resin product granulas produced by Runs 3-14 and 3-15 of Table 2 of Example 9 were taken from a bread turnover mixed with granules taken from other bed turnovers and then, with an added antioxidant agent, extruded then chopped into pellets. These resin pellets were then analyzed for their molecular properties before pellets of resins were converted into film articles. The resin pellets of Run 3-15 having an MI of 2.9 were cast extruded into a film while the resin pellets of Run 3-14 having a MI of 1 being were made into a film by a blown bubble technique.

For comparative purposes the ethylene copolymer resin of MI about 2.9 of Run 3-15 was compared to films similarly cast from Dow ELITE™ 5200 and Exxon EXCEED™ 357 C32, both of which are ethylene copolymers having an MI of about 3. Similarly, for comparative purposes the ethylene copolymer resins of Run 3-14 having an MI of about 1 was compared to blown bubble films similarly produced from Dow ELITE™ 5400 and Exxon EXCEED™ 350D60, both of which are ethylene copolymers having an MI of about 1.

This comparison of cast and blown bubble films prepared from the ethylene copolymers of the invention, in particular, the LLDPE resins of this invention, to cast and blown bubble films produced from a Dow ELITE™ or Exxon EXCEED™ resin of similar resin density and MI value is presented below.

The specific properties of these cast film resins and their resulting film articles as formed, as also as each is time aged and heat aged (as in the case of article inventory storage) are reported in Tables 3-5 below.

TABLE 3A

| CAST FILMS | | | |
| --- | --- | --- | --- |
|  | Resin | | |
| Resin Properties | Run 3-15 | Elite ™ 5200 | Exceed ™ 357C32 |
| MI (g/10 min) | 2.9 | 3.4 | 3.4 |
| MIR | 22.5 | 23.0 | 16.7 |
| Resin density (g/cc) | 0.9177 | 0.9197 | 0.9183 |
| Mw (×1000) | 94.2 | 76.6 | 84.8 |
| MWD ($M_w/M_n$) | 3.48 | 3.4 | 2.45 |
| $M_z/M_w$ | 2.23 | 2.6 | 1.80 |
| Hexene mole % (bulk) | 3.6 | 2.7 | 3.1 |
| Melt Strength (Cn) | 1.82 | NM | 1.2 |

TABLE 3A-continued

| CAST FILMS | | | |
| --- | --- | --- | --- |
|  | Resin | | |
| Resin Properties | Run 3-15 | Elite ™ 5200 | Exceed ™ 357C32 |
| T.R.E.F. |  |  |  |
| low-T peak ° C. | 63 | 62 | N/A |
| est. low-T peak mole % | 73 | 53 | N/A |
| low-T peak hexane mole % | 5.82 | 6.01 | N/A |
| Intermediate-T peak ° C. | N/A | 79 | 73 |
| est. I-T peak mole % | N/A | 30 | 100 |
| I-T peak hexene mole % | N/A | 2.88 | 3.91 |
| High-T peak ° C. | 82 | 90 | N/A |
| est. H-T peak mole % | 27 | 17 | N/A |
| H-T peak hexene mole % | 2.30 | 0.83 | N/A |

TABLE 3B

| | Resin | | |
| --- | --- | --- | --- |
| Film Properties | Run 3-14 | Elite ™ 5200 | Exceed ™ 357C32 |
| Film Gage (mil) | 0.83 | 0.83 | 0.83 |
| Film Density (g/cc) | 0.9104 | 0.9121 | 0.9101 |
| 1% Sec. Mod. (psi) |  |  |  |
| MD | 15,400 | 22,300 | 14,950 |
| TD | 18,780 | 25,250 | 20,570 |
| Tensile (psi) @ Yield |  |  |  |
| MD | 821 | 1,000 | 954 |
| TD | 806 | 970 | 938 |
| @ Break |  |  |  |
| MD | 9,982 | 9,913 | 8,896 |
| TD | 6,227 | 5,350 | 5,154 |
| Elongation (%) @ Yield |  |  |  |
| MD | 4.7 | 5.0 | 4.4 |
| TD | 6 | 4.9 | 4.6 |
| @ Break |  |  |  |
| MD | 365 | 364 | 446 |
| TD | 673 | 616 | 793 |
| Tear ± "SD" (g/mil) |  |  |  |
| MD | 252 ± 43 | 183 | 185 ± 26 |
| TD | 620 ± 53 | 773 | 615 ± 53 |
| Intrinsic Tear (g/mil) | — | 530 | ca. 460 |
| 26" Dart ± SD (g/mil) | 460 ± 30 | 212 ± 31[§] | 648 ± 76 |
| Haze (%) | 1 | 0.6 | 2.1 |
| 45° Gloss | 92.6 | 92 | 88.8 |
| Film Extension Properties |  |  |  |
| Rate (lb/h/rpm) | 5.90 | 5.85±± | 6.10 |
| E.S.O. (lb/hp/h) | 6.95 | 7.37±± | 6.36 |
| Act./max Extr. Amp | 204/240 | 180/240 | 225/240 |
| Head Pressure (psi) | 3941 | 2900±± | 4167 |

Table 4 here below reports the differentiation in cast film properties upon 6 months aging of the inventive and comparative films reported as in Table 3B above. In Table 4 the A number is the differential value in the change of film properties from those of an initial cast unaged film.

TABLE 4

Cast Films, Six Month Aged

| Film Properties | Run 3-15 | Exceed ™ 57C32 |
|---|---|---|
| Film gage (mil) | 0.82 (Δ0.01) | 0.83 (Δ = 0) |
| Film density (g/cc) | 0.9104 (Δ = 0) | 0.9102 (Δ = .0001) |
| 1% Sec. Mod. (kpsi) | | |
| MD | 16.1 (Δ = 0.7) | 16.2 (Δ = 1.25) |
| TD | 20.0 (Δ = 1.22) | 17.9 (Δ = −2.67) |
| Tear ± SD (g/mil) | | |
| MD | 367 (Δ = 115 ± 20) | 166 (Δ = −19 ± 21.5) |
| TD | 617 (Δ = −3 ± 44.5) | 555 (Δ = −60 ± 46) |
| 26" Dart ± SD | 446 (Δ = −14 ± 46.5) | 517 (Δ = −131 ± 78.5) |
| Shrink | | |
| MD | 60 (Δ = +4) | 54 (Δ = −7) |
| TD | 16 (Δ = 28) | 9 (Δ = 10) |

Produced films (inventive and comparisons) were heat aged by holding a roll of such film at 140° F. (64.4° C.) for 48 hours, and thereafter removing such film roll to room temperature (ambient) and equilibrating same to ASTM conditions (except for that of relative humidity). For cast mLLDPE resin films of this invention in comparison to Dow ELITE™ 5200 and/or Exxon EXCEED™ 357C32 resin cast films, similarly cast and heat aged, Table 5 below reports the difference in certain film properties (i.e., in the table; reported as "Δ=" either at a positive or negative value as against the property value measured for the initially produced film).

TABLE 5

Heat Aged Cast Film

| Film Properties | Run 3-15 | Elite ™ 5200 | Exceed ™ 357C32 |
|---|---|---|---|
| Film Gage (mil) | 0.83 (Δ = 0) | 0.83 (Δ = 0) | 0.83 (Δ = 0) |
| Film Density (g/cc) | 0.9130 (Δ = 0.0026) | 0.9121 (Δ = NM) | 0.9125 (Δ = 0.0024) |
| 1% Sec. Mod. (kpsi) | | | |
| MD | 17.23 (Δ = 1.8) | 19.3 (Δ = −3) | 15.78 (Δ = 0.83) |
| TD | 21.32 (Δ = 2.54) | 27.3 (Δ = 2.05) | 19.9 (Δ = −0.67) |
| Tensile (psi) @ Yield | | | |
| MD | 1149 (Δ = 328) | 1014 (Δ = 14) | 1107 (Δ = 153) |
| TD | 1091 (Δ = 285) | 970 (Δ = 119) | 1037 (Δ = 99) |
| @ Break | | | |
| MD | 9856 (Δ = −126) | 9238 (Δ = −675) | 9833 (Δ = 937) |
| TD | 6220 (Δ = −7) | 5368 (Δ = 18) | 7191 (Δ = 2037) |
| Elongation (%) @ Yield | | | |
| MD | 7.3 (Δ = 2.6) | 4.3 (Δ = −0.7) | 7.4 (Δ = 3.0) |
| TD | 6.0 (Δ = 0.4) | 4.5 (Δ = −0.4) | 6.3 (Δ = 1.7) |
| @ Break | | | |
| MD | 370 (Δ = 5) | 351 (Δ = −13) | 417 (Δ = −29) |
| TD | 704 (Δ = 31) | 633 (Δ = 17) | 711 (Δ = −82) |
| Tear ± SD (g/mil) | | | |
| MD | 138 (Δ = −114 ± 335) | 391 (Δ = 208) | 136 (Δ = −49 ± 22) |
| TD | 778 (Δ = 158 ± 53) | 827 (Δ = 57) | 615 (Δ = 0 ± 43) |
| 26" Dart ± SD | 648 (Δ = 188 ± 53) | 212 (Δ = −88) | 187 (Δ = −461 ± 50) |

As also reported by this Example, blown bubble film articles were prepared from MI±1 (LLDPE resin of this invention and also comparison=MI=1 resins of ELITE™ and EXCEED™. The specific properties of these blown film resins and their resulting film articles as formed are reported in Table 6 below.

TABLE 6A

BLOWN FILMS

| | Resin | | |
|---|---|---|---|
| Resin Properties | Run 3-14 | Elite ™ 5400 | Exceed ™ 350D60 |
| MI (g/10 min) | 1.0 | 1.26 | 0.98 |
| MIR | 23.5 | 26.0 | 16.3 |
| Resin density (g/cc) | 0.9167 | 0.9168 | 0.9186 |
| Mw (×1000) | 131 | 98.9 | 106 (+) |
| MWD ($M_w/M_n$) | 3.28 | 3.3 | 1.4 (+) |
| $M_z/M_w$ | 2.24 | 2.4 | 1.8 (+) |
| Hexene mole % (bulk) | 3.3 | 3.5 | 2.6 |
| Melt Strength (cN) | | | |
| T.R.E.F. | | | |
| low-T peak ° C. | 65 | 58 | N/A |
| est. low-T peak mole % | 72 | 37 | N/A |
| low-T peak hexene mole % | 5.44 | 6.75 | N/A |
| Intermediate-T peak ° C. | N/A | 76 | 76 |
| est. I-T peak mole % | N/A | 53 | 100 |
| I-T peak hexene mole % | N/A | 3.39 | 3.38 |
| High-T peak ° C. | 82 | 90 | N/A |
| est. H-T peak mole % | 27 | 10 | N/A |
| H-T peak hexene mole % | 2.30 | 0.76 | N/A |

TABLE 6B

| Film Properties | Resin | | |
|---|---|---|---|
| | Run 3-14 | Elite™ 5400 | Exceed™ 350D60 |
| Film Gage (mil) | 1.00 | 0.74 | 1.00 |
| Film Density (g/cc) | 0.9140 | 0.9142 | 0.9156 |
| 1% Sec. Mod. (psi) | | | |
| MD | 26,400 | 25,280 | 28,600 |
| TD | 32,100 | 29,500 | 30,900 |
| Tensile (psi) @ Yield | | | |
| MD | 1244 | 1117 | 1250 |
| TD | 1265 | 1190 | 1328 |
| Tensile @ Break | | | |
| MD | 7782 | 8863 | 8485 |
| TD | 9755 | 7856 | 10,026 |
| Elongation (%) @ Yield | | | |
| MD | 4.7 | 4.2 | 4.8 |
| TD | 4.7 | 4.4 | 4.9 |
| Elongation @ Break | | | |
| MD | 424 | 440 | 465 |
| TD | 624 | 569 | 644 |
| Tear ± "SD" (g/mil) | | | |
| MD | 238 ± 22 | 273 | 249 ± 24 |
| TD | 495 ± 17 | 526 | 500 ± 25 |
| Intrinsic Tear (g/mil) | ca 390 | 510 | 390 |
| 26" Dart ± SD (g/mil) | 1238 ± 114 | 1237 ± 105§ | 927 ± 84 |
| Haze (%) | 13.1 | 7.1 | 12.6 |
| 45° Gloss | 44 | 58 | 39 |
| Film Extrusion Properties | | | |
| Rate (lb/h/rpm) (__/h/rpm) | 3.3 | 6.2 | 3.2 |
| E.S.O. (lb/hp/h) (__/h/rpm) | 11.6 | 13.4 | 9.96 |
| Act./max Extr. Amp | 68.6/125 | 170/240 | 74/129 |
| Head Pressure (psi) (kPa) | 3490 | 5310 | 3650 |

While the present invention has been described and illustrated by reference to particular embodiments, those of ordinary skill in the art will appreciate that the invention lends itself to variations not necessarily illustrated herein. It is contemplated that the catalyst system of this invention can be used in combination with other catalyst systems comprising more than one catalyst system of the invention. For this reason, then, reference should be made solely to the appended claims for purposes of determining the true scope of the present invention. Various changes in the details of the illustrated apparatus and construction and method of operation may be made without departing from the spirit of the invention.

We claim:

1. A catalyst system comprising a hafnocene catalyst compound and zirconocene catalyst compound, wherein hafnocene catalyst compound and/or zirconocene catalyst compound include(s) at least one ligand substituted with at least one linear or iso alkyl group having 3 or more carbon atoms, and wherein the transition metal content of the hafnocene and zirconocene catalyst compounds comprises 95 mole % Hf or greater, an activator, and optionally, a antistatic agent and/or a support.

2. The catalyst system of claim 1, wherein the hafnocene and the zirconocene are represented by the formula:

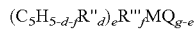

$(C_5H_{5-d-f}R''_d)_e R'''_f MQ_{g-e}$ wherein $(C_5H_{5-d-f}R''_d)$ is an unsubstituted or substituted cyclopentadienyl ligand bonded to M, wherein at least one $(C_5H_{5-d-f}R''_d)$ is substituted with at least one R'' which is a linear or iso alkyl substituent having 3 or more carbon atoms, each additional R'', which can be the same or different is hydrogen or a substituted or unsubstituted hydrocarbyl having from 1 to 30 carbon atoms or combinations thereof or two or more carbon atoms are joined together to form a part of a substituted or unsubstituted ring or ring system having 4 to 30 carbon atoms, R''' is one or more or a combination of the group consisting of carbon, germanium, silicon, phosphorous and nitrogen atoms containing radical bridging two $(C_5H_{5-d-f}R''_d)$ rings, or bridging one $(C_5H_{5-d-f}R''_d)$ ring to M;

each Q which can be the same or different is selected from the group consisting of a hydride, substituted and unsubstituted hydrocarbyl having from 1 to 30 carbon atoms, halogen, alkoxides, aryloxides, amides, phosphides and combination thereof; two Q's together form an alkylidene ligand or cyclometallated hydrocarbyl ligand or other divalent anionic chelating ligand;

where g is an integer corresponding to the formal oxidation state of M, d is 0, 1, 2, 3, 4 or 5, f is 0 and e is 1, 2 or 3; and M is Zr or Hf, respectively.

3. The catalyst system of claim 1, wherein the substitution is selected from one or more of the group consisting of n-propyl, isopropyl, n-butyl, isobutyl,l and n-pentyl.

4. The catalyst system of claim 1, wherein the hafnocene and zirconocene are bis(n-propyl-cyclopentadienyl)hafnium dichloride or dimethyl and bis(n-propyl-cyclopentadienyl) zirconium dichloride or dimethyl, respectively.

5. The catalyst system of claim 1, wherein the transition metal content of the hafnocene and zirconocene catalyst compounds comprises 97 mole % Hf or greater.

6. The catalyst system of claim 1, wherein the transition metal content of the hafnocene and zirconocene catalyst compounds comprises 98 mole % Hf or greater.

7. The catalyst system of claim 1, wherein the transition metal content of the hafnocene and zirconocene catalyst compounds comprises 99 mole % Hf or greater.

8. The catalyst system of claim 1, wherein the antistatic agent is present and comprises N,N-bis(2-hydroxyethyl)octadecylamine.

9. The catalyst system of claim 1, wherein the support is present and comprises silica.

10. The catalyst system of claim 9, wherein the silica is dehydrated at 600° C.

11. The catalyst system of claim 1, wherein the activator is methylalumoxane or modified alumoxane.

12. The catalyst system of claim 1, wherein the activator is a non-coordinating ionic activator or ionizing activator.

13. A process for polymerizing olefin(s) in a reactor, the process comprising contacting the activated catalyst system of claim 1 with monomers to produce a polymer product.

14. The process of claim 13, wherein the process is a gas phase process.

15. The process of claim 13, wherein the process is a slurry process.

16. The process of claim 13, wherein the monomers comprise ethylene and at least one comonomer having from 4 to 8 carbon atoms.

17. The process of claim 13, wherein the monomers comprise ethylene and at least one of butene-1, hexene-1, and octene-1.

18. The process of claim 13, wherein the process further comprises the addition of $H_2$.

* * * * *